3,651,163
DEALKYLATION OF ALKYL BENZENES AND NAPHTHALENES

Herschel D. Radford, Flossmoor, Ill., and Hans P. Pohlmann, Highland, and Louis C. Gutberlet, Crown Point, Ind., assignors to Standard Oil Company, Chicago, Ill.
No Drawing. Filed Feb. 27, 1969, Ser. No. 803,107
Int. Cl. C07c *3/58;* C10g *13/08, 39/00*
U.S. Cl. 260—672 R                                           12 Claims

ABSTRACT OF THE DISCLOSURE

Alkyl benzenes and/or alkyl naphthalenes are dealkylated by contacting a feed stock rich in these compounds at elevated temperatures and under hydrogen pressure with a catalyst comprising a silica-alumina cracking base impregnated with a hydrogenation component, a second metal from Group V–A of the Periodic Table, and a halogen. The preferred hydrogenation component is nickel, the preferred Group V–A metal is arsenic, and the preferred halogen is fluorine. In the recovered product, at least a portion of the compounds have a reduced number of alkyl groups.

---

The present invention relates to an improved method for dealkylating alkyl cyclic organic compounds, and more particularly to the dealkylation of organic compounds selected from the group consisting of alkyl benzenes, alkyl naphthalenes, and mixtures thereof.

In many commercial processes, and particularly those associated with the petroleum industry, it is often desirable to remove all or a portion of the alkyl groups from cyclic compounds, particularly those having a benzene or naphthalene nucleus. For example, commercial quantities of naphthalene are often produced by dealkylating alkyl naphthalenes that are a byproduct of reforming reactions employed in the production of gasoline. Dealkylation may be employed selectively, for example, to remove only the alkyl groups higher than methyl, or may be employed to strip all of the alkyl groups from the cyclic nucleus. Similarly, dealkylation may be employed to increase the octane number of reformates boiling in the gasoline range by enriching them in high octane-producing compounds. Dealkylation may be accompanied by isomerization and disproportionation, and may also be accompanied by the simple formation of light hydrocarbons from the alkyl groups that are stripped from the cyclic nucleus.

It has now been found that organic compounds selected from the group consisting of alkyl benzenes, alkyl naphthalenes, and mixtures thereof, may be dealkylated by contacting a feed stock rich in these alkyl organic compounds at elevated temperatures and under hydrogen pressure with a catalyst comprising a silica-alumina cracking base impregnated with a hydrogenation component, a second metallic component, and a halogen. The hydrogenation component is selected from the group consisting of cobalt, nickel, platinum, rhodium, and palladium. The second metallic component, often referred to as a "poison," is selected from the group consisting of arsenic, antimony, bismuth, and phosphorus. The hydrogenation component is present in an amount from about 0.1% to about 40% based on the total weight of the catalyst, and the second metallic component is present in an amount from about 0.1 to about 2.0 gram atoms per gram atom of the hydrogenation component. The halogen is present in the catalyst before contact with the feedstock in an an amount from about 0.5% to about 15%, based on the total weight of the catalyst. A catalyst which is suitable for use in carrying out the method of the present invention is described in U.S. Pat. No. 3,206,391, issued Sept. 14, 1965, and assigned to the assignee of this application.

More specifically, the dealkylation reactions in accordance with the present invention are preferably carried out in the presence of the aforementioned catalyst under hydrogen pressures of 100–3000 p.s.i.g., 1000–50,000 standard cubic feet of hydrogen per barrel of feed, at temperatures of 300–1500° F., and liquid hourly space velocities of 0.1–30.

It will, of course, be understood that the particular reaction conditions employed depend upon the feed stock and the product desired. For example, more extreme reaction conditions are obviously required to remove methyl groups from a cyclic nucleus than to remove the more readily cleavable ethyl and higher groups. To increase the octane number of a reformer stream, wherein it is desired to remove alkyl groups higher than methyl, a preferred range of reaction conditions includes hydrogen pressures of 100–1000 p.s.i.g., 5000–30,000 standard cubic feet of hydrogen per barrel of feed, a temperature of 800–1200° F., and a liquid hourly space velocity of 0.5–30. In any dealkylation reaction, as those skilled in the art will realize, the optimum reaction conditions may be achieved by monitoring the outflow stream from the reactor and adjusting the reaction conditions accordingly.

As previously mentioned, the catalyst employed in the present invention comprises a hydrogenation component, a solid acidic catalyst base component, and a second normally solid element of Group V–A of the Periodic Table, i.e., phosphorus, arsenic, antimony, and bismuth.

The acidic base comprises either naturally occurring or synthetic alumino-silicates, preferably containing about 5% to about 40% alumina by weight. The acidic component of the catalyst should be highly porous, having a surface area between about 100 and 800 square meters per gram. The preparation and properties of the catalyst base are well known in the art, and they need not be described further herein for the purpose of the present invention. It should be borne in mind that both naturally occurring and synthetic crystalline alumino-silicates, as well as amorphous alumino-silicates, may be employed as a catalyst base in accordance with the present invention. Included within this class are the acid treated clays and the so-called molecular sieves, particularly the large-pore molecular sieves having a pore diameter of about 8–9 angstroms and having the crystal structure of faujasite.

The hydrogenation component may comprise any of the well-known metallic hydrogenation catalysts, but is preferably selected from the metals of Group VIII of the Periodic Table, especially nickel, platinum, cobalt, and palladium. The hydrogenation component of the catalyst can advantageously be incorporated into the catalyst by impregnating a porous acidic base with a heat-decomposable compound of the hydrogenation component, followed by calcining to provide a composite. Typically, the catalyst base is impregnated with a solution of nickel acetate, chloroplatinic acid, or the like, and then dried. The drying is followed by pelleting and calcining at an elevated temperature of around 1000° F.

The finished catalyst may also be produced by other methods well known in the art such as co-gelling the various components and other well-known variations in catalyst preparation techniques.

The amount of hydrogenation component incorporated into the catalyst can vary over a wide range, with the amount being selected to provide the desired catalyst activity for the reaction contemplated. For example, large amounts of nickel, up to about 40% by weight, can be employed; and relatively small amounts of nickel, as little as 0.1% by weight, are also effective, with about 0.1 to 10% by weight nickel being preferred. Typically, about 0.1 to 2% platinum is effective in the catalyst, and preferably about 0.1 to 1% by weight platinum is employed.

The second metallic component may be incorporated into the catalyst during its manufacture by techniques well known in the art. For example, a nickel-silica-alumina composite of the type described above may be impregnated with a solution of an organic compound of the Group V-A elements, including aryl or alkyl substituted organometallics, such as triphenyl arsine, triphenyl stibine, etc., with the subsequent evaporation of the solvent to leave a deposit on the base. Also, the catalyst base can be impregnated with inorganic compounds including the acids, ammonium salts, nitrates, halides, etc., of the normally solid Group V-A elements, e.g., arsenic trioxide in an ammoniacal solution, followed by drying. Prior to use, the catalyst is treated with hydrogen at elevated temperatures. An organic compound of arsenic may also be introduced into the reaction zone with the feed, so that the base is impregnated with the Group V-A element in situ. Of the Group V-A elements, arsenic is preferred.

Normally, only a small amount of the Group V-A element is required in the catalyst. The total amount employed will most often be governed by the amount of hydrogenation component incorporated into the catalyst, and by the form of the Group V-A metal. For example, arsenic may be present as either the arsenide or subarsenide. Generally speaking, no more than one gram atom of the normally solid Group V-A element per gram atom of the hydrogenation component is required in the catalyst, although greater amounts may be employed as long as the desired catalytic activity is maintained. Specifically, arsenic is employed in a ratio of up to about 2 gram atoms per gram atom of hydrogenation component in the catalyst. Advantageously, however, about 0.01 to about 1.0 gram atoms of such elements per gram atom of hydrogenation component is employed, while a ratio of from about 0.1 to about 0.5 is preferred.

An exemplary catalyst, which produces outstanding results in accordance with the method of the present invention, consists essentially of a Group VIII hydrogenation components, especially nickel; a normally solid element of Group V-A, especially arsenic, fluorine, and a silica-alumina catalyst base. As previously mentioned, a wide range of silica-alumina bases are well known in the art.

A particularly useful catalyst base in accordance with the present invention is so-called "high alumina" amorphous base containing about 20–30 weight percent $Al_2O_3$. A typical catalyst has about 0.5 to 5 weight percent nickel supported on the catalyst base, although up to about 10 weight percent nickel may be used in some instances. About 0.5–15 weight percent, and preferably about 1–4 weight percent, halide is incorporated into the catalyst by impregnating the catalyst base, either with or without the hydrogenation component, with an organic or inorganic halide compound which reacts therewith. Fluorine is the preferred halide since it has been found to impart an exceptionally high activity to the catalyst. The various components may be combined with the catalyst base either simultaneously or in a step-wise manner, followed by drying and calcining. In the latter case, exceptionally good results have been obtained by impregnating silica-alumina containing nickel with an inorganic fluoride solution, such as ammonium fluoride. However, the catalyst base may be impregnated with a single solution containing a nickel compound, an arsenic compound, and the halide. Compounds containing more than one of the components, for example, nickel fluoride, may also be used advantageously.

In the preparation of the above-described catalyst, exceptionally high activity has been produced when the catalyst is pre-reduced in a hydrogen atmosphere at 700– 900° F., calcined at 900–1100° F., and then reduced again in hydrogen at 700–900° F.

Various halogen compounds may be used in preparing the preferred catalyst. These include inorganic compounds and alkyl or aryl organic compounds such as hydrogen fluoride, ammonium fluoride, fluorobenzene, benzotrifluoride, benzyl fluoride, etc., although all are not necessarily equivalent in their effect upon the catalyst.

After the catalyst has become exhausted, it may be regenerated according to techniques which are well known in the art. A suitable regeneration procedure is set forth in aforementioned U.S. Pat. No. 3,206,391.

The following examples are intended to illustrate the present invention, and should not be consumed as limitative, the scope of the invention being determined by the appended claims.

EXAMPLE I

A catalyst for use in the method of the present invention, was prepared utilizing an amorphous silica-alumina base having about 25% alumina by weight and 75% silica by weight. The base was impregnated with about 2% fluorine, 8% nickel, and 2.5% arsenic, based on the total weight of the catalyst. The catalyst was sized so that none of the particles would pass a 20 mesh screen, but all would pass a 14 mesh screen. This was a smaller size than would be used under normal commercial conditions, wherein a pelleted catalyst would be employed. However, this smaller size was more suitable for an experimental run.

The reactor employed was of stainless steel tubing having an inside diameter of 0.62 inch. The feed stock consists of 30 volume percent ethyl toluene and 70 volume percent pseudocumene. The reaction was carried out at 1000° F., 700 p.s.i.g., 1 liquid hourly space velocity, and a hydrogen flow rate of 10,000 standard cubic feet per barrel of feed. The product was analyzed for its various components, and the results are shown below in Table I.

TABLE I

| Product component: | Weight percent |
|---|---|
| Benzene | 3.5 |
| Toluene | 23.0 |
| Ethylbenzene | 0.9 |
| p-Xylene | 10.3 |
| m-Xylene | 22.1 |
| o-Xylene | 10.6 |
| Ethyltoluenes | 1.0 |
| Mesitylene | 5.9 |
| Pseudocumene | 16.3 |
| Hemimellitine | 2.6 |
| Higher boiling components | 4.5 |

As demonstrated in Table I, the product of the reaction is virtually free of any aromatic nuclei having alkyl groups higher than methyl. Almost all of the ethyltoluene has been converted to benzene or methyl-substituted benzenes, and the pseudocumene content has similarly been reduced, to a large degree. The ethyl radicals have been disproportionated to form organic compounds having one or more methyl groups on the aromatic nucleus. The product is characterized by nearly a total absence of aromatic nuclei having alkyl groups higher than methyl.

EXAMPLE II

The following example demonstrates the advantageous results that may be achieved in accordance with the present invention when it is desired to improve the volatility of the gasoline stream coming from a reformer.

Three reformer streams, the $C_8+$ fraction, the $C_9+$ fraction, and the heavy reformate fraction were each analyzed for benzene, toluene, $C_8$ aromatics, $C_9$ aromatics, and $C_{10}+$ aromatics. Each of these streams was then reacted over the catalyst employed in Example I at 1000° F., 700 p.s.i.g., 1 liquid hourly space velocity, and a hydrogen feed rate of 8000 standard cubic feet per barrel of feed. After the reactions, the samples were again analyzed. The results are shown in Table II below.

TABLE II

| | Weight percent | | | | | |
|---|---|---|---|---|---|---|
| | Heavy reformate | | $C_8+$ fraction | | $C_9+$ fraction | |
| Component | Feed | Product | Feed | Product | Feed | Product |
| Benzene | | 8 | | 8 | | 3 |
| Toluene | 17 | 24 | 6 | 18 | | 14 |
| $C_8$ aromatics | 26 | 37 | 33 | 36 | 10 | 29 |
| $C_9$ aromatics | 33 | 29 | 38 | 31 | 90 | 34 |
| $C_{10}+$ aromatics | 24 | 2 | 23 | | | 20 |

As can be seen from the above table, the product is significantly reduced in the heavier, higher-boiling alkyl aromatics, and is enriched in the lower-boiling components, thus upgrading the volatility of the overall product.

EXAMPLE III

In order to determine the effect of the present invention upon the octane number of gasoline streams, a relatively low octane number reformer product, characterized by the presence of a relatively large proportion of higher alkyl aromatics, was treated in a manner similar to that described above in Example II. The reaction was characterized by the formation of ethane, propane, n-butane, i-butane, n-pentane, and i-pentane, along with increased amounts of benzene, toluene, xylenes, and trimethyl benzenes. The light hydrocarbons were apparently formed by removing the side chains from the higher alkyl benzenes. Although methane may also have been present in the product gas, the analysis method used was not suitable for its detection.

The above reaction was carried out with both a whole reformer product of low octane content, and also with a low octane $C_8+$ reformer product. The results are shown in Table III below.

TABLE III

| | Whole reformate | | $C_8+$ reformate | |
|---|---|---|---|---|
| | Feed | Product | Feed | Product |
| Research octane number | 90.4 | 98.1 | | 105.3 |
| Motor octane number | 80.8 | 86.4 | 96.2 | 99.4 |

As shown by the above table, a significant increase in octane number is achieved when reformates are treated in accordance with the method of the present invention.

Obviously, many modifications and variations of the invention as hereinbefore set forth will occur to those skilled in the art, and it is intended to cover in the appended claims all such modifications and variations as fall within the true spirit and scope of the invention.

We claim:

1. A method for dealkylating alkyl organic compounds selected from the group consisting of alkyl benzenes, alkyl naphthalenes, and mixtures thereof, comprising: contacting a feed stock rich in said organic compounds at elevated temperatures and under hydrogen pressure with a catalyst comprising a silica-alumina cracking base impregnated with a hydrogenation component, a second metallic component, and a halogen, said hydrogenation component being selected from the group consisting of cobalt, nickel, platinum, rhodium, and palladium, and being present in an amount from about 0.1 percent to about 40 percent based on the weight of said catalyst; said metallic component selected from the group consisting of arsenic, antimony, bismuth, and phosphorus, and being present in an amount from about 0.1 to about 2.0 gram atoms per gram atom of said hydrogenation component; and said halogen being present in said catalyst before contact with the feed stock in an amount from about 0.5 percent to about 15 percent based on the weight of said catalyst; and recovering a product wherein at least a portion of said compounds have a reduced number of alkyl groups.

2. The method as defined in claim 1 wherein said feed stock is rich in alkyl organic compounds having at least one alkyl group characterized by the formula $-C_nH_{2n+1}$ wherein $n$ is an integer greater than one, and wherein said product is substantially reduced in said alkyl group.

3. The method as defined in claim 1 wherein said feed stock is rich in alkylnaphthalenes, and wherein said product is reduced in alkylnaphthalene content and enriched in naphthalene content.

4. A method for dealkylating alkyl organic compounds selected from the group consisting of alkyl benzenes, alkyl naphthalenes and mixtures thereof, comprising: contacting a feed stock rich in said organic compounds with a catalyst at temperatures of about 300–1500° F., under hydrogen pressures of about 100–3000 p.s.i.g., liquid hourly space velocities of about 0.1 to 30, and hydrogen feed rates of about 1000 to 50,000 standard cubic feet per barrel of feed, said catalyst comprising a silica-alumina cracking base impregnated with a hydrogenation component, a second metallic component, and fluorine, said hydrogenation component selected from the group consisting of cobalt, nickel, platinum, rhodium, and palladium, and being present in an amount from about 0.1 to about 10 percent based on the weight of said catalyst; said second metallic component selected from the group consisting of arsenic, antimony, bismuth, and phosphorus, and being present in an amount from about 0.1 to about 0.5 gram atom per gram atom of said hydrogenation component; and said fluorine being present in an amount from about 1 percent to about 4 percent, based on the weight of said catalyst; and recovering a product wherein at least a portion of said organic compounds have a reduced number of alkyl groups.

5. The method as defined in claim 4 wherein said feed stock comprises alkyl organic compounds having at least one alkyl group characterized by the formula $-C_nH_{2n+1}$ wherein $n$ is greater than 1, and wherein said product is substantially reduced in said alkyl group.

6. The method as defined in claim 4 wherein said feed stock is rich in alkyl naphthalenes, and wherein said product is reduced in alkyl naphthalene content and enriched in naphthalene content.

7. The method as defined in claim 6 wherein said feed stock comprises a mixture of alkyl naphthalenes, paraffins, and other aromatics, and further including the step of recovering naphthalene from said product.

8. The method as defined in claim 4 wherein said feed stock is a reformate boiling in the gasoline range, and wherein said product is increased in octane number.

9. A method for dealkylating alkyl organic compounds selected from the group consisting of alkyl benzenes, alkyl naphthalenes, and mixtures thereof, comprising: contacting a feed stock rich in said organic compounds with a catalyst at temperatures of about 300–1500° F., under hydrogen pressures of about 100–3000 p.s.i.g., liquid hourly space velocities of about 0.1 to 30, and hydrogen feed rates of about 1000 to 50,000 standard cubic feet per barrel of feed, said catalyst comprising a silica-alumina cracking base impregnated with nickel, arsenic, and fluorine, said nickel being present in an amount from about 0.1 to about 10 percent based on the weight of said catalyst, said arsenic being present in an amount from about 0.1 to about 0.5 gram atom per gram atom of said nickel, and said fluorine being present in an amount from about 1 percent to about 4 percent, based on the total weight of said catalyst; and recovering a product wherein at least a portion of said organic compounds have a reduced number of alkyl groups.

10. The method as defined in claim 9 wherein said feed stock comprises alkyl organic compounds having at least one alkyl group characterized by the formula $-C_nH_{2n+1}$ wherein $n$ is greater than 1, and wherein said product is substantially reduced in said alkyl group.

11. The method as defined in claim 9 wherein said feed stock is rich in alkyl naphthalenes, and wherein said product is reduced in alkyl naphthalene content and enriched in naphthalene content.

12. The method as defined in claim 9 wherein said feed stock is a reformate boiling in the gasoline range, and wherein said temperatures are in the range of 800–1200° F., said hydrogen pressures are in the range of 500–1000 p.s.i.g., said liquid hourly space velocities are in the range of 0.5–30, and said hydrogen feed rates are in the range of about 5000 to 30,000 standard cubic feet per minute per barrel of feed; and wherein said product is increased in octane number.

References Cited

UNITED STATES PATENTS

| | | | |
|---|---|---|---|
| 2,752,289 | 6/1956 | Haensel | 208—139 |
| 3,206,391 | 9/1965 | Gutberlet et al. | 208—110 |
| 3,377,400 | 4/1968 | Wise | 260—668 |
| 3,417,157 | 12/1968 | Pollitzer | 260—672 |
| 3,437,710 | 4/1969 | Pollitzer | 260—672 |
| 3,442,966 | 5/1969 | Pollitzer | 260—672 |

FOREIGN PATENTS

| | | | |
|---|---|---|---|
| 1,104,409 | 2/1968 | Great Britain | 208—111 |

PAUL M. COUGHLAN, Jr., Primary Examiner

G. E. SCHMITKONS, Assistant Examiner

U.S. Cl. X.R.

208—111, 139; 252—432, 441, 455 R; 260—668 A, 671 M, 672 T

UNITED STATES PATENT OFFICE
CERTIFICATE OF CORRECTION

Patent No. 3,651,163                     Dated March 21, 1972

Inventor(s) Herschel D. Radford et al

It is certified that error appears in the above-identified patent and that said Letters Patent are hereby corrected as shown below:

Col. 4, line 14, "consumed" should be "construed".

Col. 5, Table II, under $C_8+$ fraction, opposite $C_{10}+$ aromatics, insert a "7".

Signed and sealed this 5th day of September 1972.

(SEAL)
Attest:

EDWARD M. FLETCHER, JR.
Attesting Officer

ROBERT GOTTSCHALK
Commissioner of Patents